Figure 1:
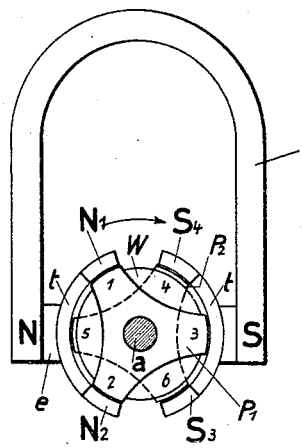

June 10, 1924.

W. WALTHER 1,497,393

MAGNETO ELECTRIC IGNITION APPARATUS

Filed Aug. 11, 1921

Wilhelm Walther
Inventor
by R. F. Steward
his atty

Patented June 10, 1924.

1,497,393

UNITED STATES PATENT OFFICE.

WILHELM WALTHER, OF STUTTGART, GERMANY, ASSIGNOR TO ROBERT BOSCH AKTIENGESELLSCHAFT, OF STUTTGART, GERMANY.

MAGNETO-ELECTRIC IGNITION APPARATUS.

Application filed August 11, 1921. Serial No. 491,557.

*To all whom it may concern:*

Be it known that I, WILHELM WALTHER, residing at 161 Kanonenweg, Stuttgart, Germany, have invented certain new and useful Improvements in Magneto-Electric Ignition Apparatus, of which the following is a specification.

There are different systems of magneto electric ignition apparatus in which more than two sparks can be produced in a single rotation of the rotating member. The invention relates to one such system in which there is a rotating armature of which the core lies in the axis of rotation and which core is provided at each of its opposite ends with at least two radial pole shoes, the pole shoes at each end being angularly displaced relative to the pole shoes at the other end of the core. In such armatures magnetic lines of force enter a pole shoe at one end of the armature, traverse the length of the armature core and leave by a pole shoe at the other end of the armature.

The winding in which current is induced by the magnetic flux is wound about the armature core between the two pole stars and may either rotate with the armature or be stationary. The number of the changes of the lines of force in the effective iron and consequently of the sparks produced during one rotation of the armature is twice as great as the number of the pole shoes at one end of the armature or equal to the total number of armature pole shoes.

If an armature of this type rotates between the limbs of a horse shoe or of a cylindrical permanent magnet with the usual magnet pole shoes only a relatively weak current is produced because only one of the radial armature pole shoes at each end of the armature comes at any one time into the cooperative relation with the magnet pole shoes required for the magnetic flux through the armature and the cross-section provided for the magnetic flux by a single radial armature pole shoe is too small.

The object of my invention is to increase this cross-section provided for the magnetic flux by such a construction of the magnet pole shoes and cooperative arrangement of the radially disposed armature pole shoes with respect thereto that the magnetic flux passes at the same time through at least two armature pole shoes at each end of the armature. The magnet pole shoes can either be fixed or adjustable, for example by means of an adjustable sleeve. The adjustability serves the known purpose of obtaining the most favorable conditions as regards the positions of the poles at each setting of the time of ignition.

In order to make my invention more clear, I refer to the accompanying drawing, in which is shown, by way of example, an ignition apparatus producing six sparks at each armature rotation with magnet pole shoes which are not adjustable.

Figure 2:
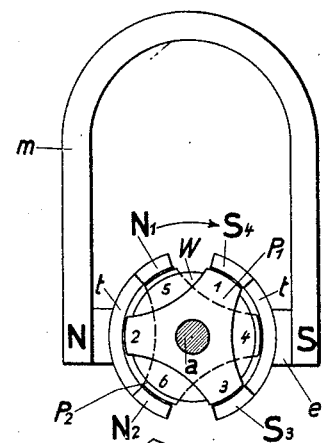
Figure 3:
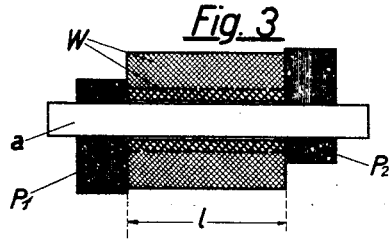
Figure 4:
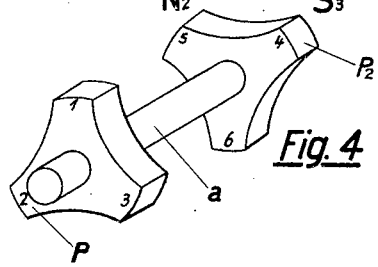
Figure 5:
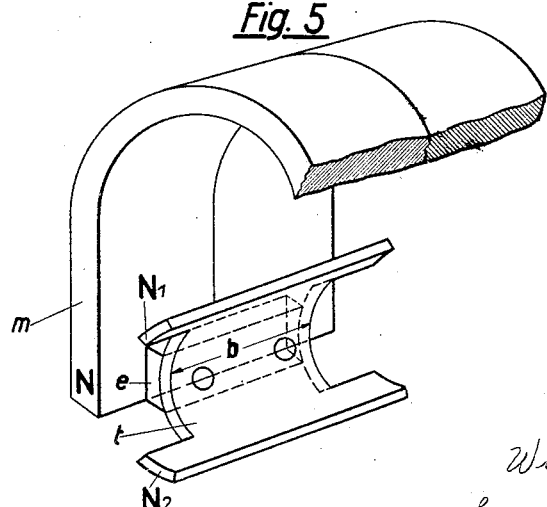

Figs. 1 and 2 show the apparatus diagrammatically in front view in two different positions of the armature. Fig. 3 is an axial section through the armature only and Fig. 4 is a perspective view of the armature but without the winding. In Fig. 5 the magnetic system of the ignition apparatus according to Fig. 1 is represented in perspective and is broken off so that one of the two magnet pole shoes can be fully seen.

On the cylindrical amature core $a$ two three-armed, preferably laminated, pole stars $p^1$ and $p^2$ are arranged at a certain angular distance apart and are so relatively displaced that each arm of a star is exactly midway between two arms of the other star (Figs. 1, 2 and 4). Between the two stars $p^1$ and $p^2$ the winding $w$, which may consist of a primary and a secondary part, is secured on and rotates with the armature core $a$. The winding $w$ may be equally well arranged to be stationary. The magnet system $m$ is in the example shown of the horse-shoe type. The invention is, however, independent of the form of the magnet. On the other hand, it is essential that the magnet system, as in the ordinary ignition apparatus with a double T armature, should be bipolar, that is, should have only a single pair of poles N and S. The pole shoes of the permanent magnet $m$ have the form of cylindrical segments (Figs 1, 2 and 5). Each pole shoe consists of two strips $N^1$, $N^2$ or $S^3$, $S^4$ extending the whole length of the armature and about as broad as the end surface of an armature pole shoe, and which are connected by a bridge piece $t$, of which the length $b$ is not greater than the length $l$ of the space between the two pole stars $p^1$ and $p^2$. The connection between these segments and the corresponding magnet poles N and S is established by a soft iron member e. The two strips of each magnet pole shoe are arranged relatively at the same angle as the two adjacent arms of the armature pole star. Consequently, the magnetic lines of force from the north pole N can always enter at the same time through two arms of the one pole star into the armature and also can pass through two arms of the other pole star to the south pole S.

In the armature position shown in Fig. 1, the magnetic flux passes from the north pole N partly through the pole shoe strip $N^1$ into the arm 1 of the front armature pole star $p^1$, partly through the pole shoe strip $N^2$ into the arm 2 of the same star, and then traverses the length of the armature core $a$ and divides at the rear pole star $p^2$, one part traversing the arm 4 and the pole shoe strip $S^4$ and the other part the arm 6 and the strip $S^3$ to the south pole S.

When the armature turns in the direction of the arrow it passes into the position shown in Fig. 2. In this position the magnetic flux traverses the armature core $a$ in the reversed direction. The lines of force pass from the pole shoe strips $N^1$, $N^2$ of the north pole N through the arms 5 and 6 of the rear pole star $p^2$ into the armature, and through the arms 1 and 3 of the front star $p^1$ into the pole shoe strips $S^4$ and $S^3$ of the south pole S. Upon a further rotation of the armature, the arms 2 and 3 of the front armature star $p^1$ arrive simultaneously in juxtaposition to the pole shoe strips $N^1$ $N^2$ and the arms 4 and 5 of the rear armature star $p^2$ in juxtaposition to the pole shoe strips $S^3$ and $S^4$, so that the magnetic flux again changes direction and now traverses the armature core from the front to the rear.

The direction of the magnetic flux, therefore, changes through the armature at each polar projection and during one rotation of the armature there are as many reversals as there are arms on the two pole stars.

In order for example, that there should be eight sparks in one revolution of the armature, each pole star must have four arms; for ten sparks five arms, and so on. With a large number of sparks there are no difficulties in allowing the magnetic flux to pass at the same time through three or perhaps more arms to each end of the armature, if the pole shoes and the magnet system $m$ are provided with a corresponding number of strips. In this manner the cross section for the lines of force may be still further increased. In order that during advanced ignition as well as retarded ignition the most favourable conditions may be obtained, it is only necessary that the segmental sleeves $N^1$, $t$ $N^2$, and $S^3$, $t$ $S^4$ should be loose and in a known manner adjustably arranged on the intermediate members $e$ of the poles of the magnet.

Having now described my invention, what I claim as new and desire to secure by Letters Patent of the United States is:

1. A magneto-electric ignition apparatus comprising, in combination, a bipolar magnet, a rotor cooperating therewith, magnet pole shoes each comprising a plurality of strip elements extending parallel with said rotor and spaced one from another circumferentially thereof and united by a magnetic-bridge piece of segmental form, said rotor being provided at opposite ends with radially extending portions adapted to simultaneously cooperate with said strip elements in successive alternation of the direction of the magnetic flux through said armature.

2. A magneto-electric ignition apparatus comprising, in combination, a bipolar magnet, a rotor cooperating therewith, magnet pole shoes each comprising a plurality of strip elements extending parallel with said rotor and spaced one from another circumferentially thereof and united by a magnetic-bridge piece of segmental form, a set of a plurality of radially extending rotor elements adjacent each end of said rotor, said rotor elements of each set being angularly separated one from another and the sets being angularly displaced so as to be brought into successive coaction with the strip elements of said pole shoes in opposite magnetic relations, and a suitable winding surrounding said rotor between said rotor elements.

3. A magneto-electric ignition apparatus comprising, in combination, a bipolar magnet, a rotatable armature having a core located in the axis of rotation and a plurality of radially extending armature pole shoes adjacent each end of said core equi-angularly spaced one from another, pole shoes attached to said magnet, said magnet pole shoes comprising strip elements extending parallel with said armature core, spanning said armature pole shoes and spaced circumferentially about said armature at the spacing angle of said armature pole shoes, and a magnetic-bridge piece of segmental form between the strips of each of said magnet pole shoes.

4. A magneto-electric ignition apparatus comprising, in combination, a bipolar magnet, a rotatable armature having a core located in the axis of rotation and a set of a plurality of radially extending armature pole shoes adjacent each end of said core, said pole shoes being equiangularly spaced one from another and the pole shoes of one set being angularly displaced from the pole shoes of the other set, pole shoes attached to said magnet and comprising strip elements extending parallel with said armature core, spanning said sets of armature pole shoes and spaced circumferentially about said armature at the spacing angle of said armature pole shoes, and a magnetic-bridge piece of segmental form between the strips of each of said magnetic pole shoes.

5. A magnetic-electric ignition apparatus comprising, in combination a bipolar magnet, a rotatable armature cooperating therewith, magnet pole shoes each comprising a plurality of strip elements extending parallel with said armature and spaced one from another circumferentially thereof and united by a magnetic-bridge piece of segmental form, said armature having a core located in the axis of rotation and a plurality of radially extending armature pole shoes adjacent each end of said core, circumferentially spaced one from another at the spacing distance of said strip elements, relatively angularly displaced at opposite ends of said core to cooperate with strip elements of opposite poles causing the lines of force traversing said armature to alternate in direction.

6. A magneto-electric ignition apparatus comprising, in combination, a rotatable armature having a core located in the axis of rotation, three-armed pole shoes attached to the ends of said core in such relative positions of angular displacement that the magnetic lines of force between the poles of said magnetic traverse the length of said armature core in alternate directions, and pole shoes attached to said magnet and formed of strip elements spanning said armature pole shoes and spaced circumferentially of said armature through the angle of adjacent arms of said armature pole shoes, and a magnet-bridge piece of segmental form uniting the strip elements of each of said magnet pole shoes and of an extent circumferentially of said armature not greater than the circumferential distance between the ends of adjacent arms of said armature pole shoes.

In testimony whereof I have affixed my signature in presence of two witnesses.

WILHELM WALTHER.

Witnesses:
HELMA PANDER,
ALFRED NEZER.